(12) United States Patent
Yasuda et al.

(10) Patent No.: US 7,474,452 B2
(45) Date of Patent: Jan. 6, 2009

(54) MICRO-OSCILLATING MEMBER, LIGHT-DEFLECTOR, AND IMAGE-FORMING APPARATUS

(75) Inventors: Susumu Yasuda, Tokyo (JP); Yasuhiro Shimada, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/107,410

(22) Filed: Apr. 22, 2008

(65) Prior Publication Data

US 2008/0204843 A1 Aug. 28, 2008

Related U.S. Application Data

(62) Division of application No. 11/780,846, filed on Jul. 20, 2007, now Pat. No. 7,388,702, which is a division of application No. 10/544,173, filed as application No. PCT/JP2004/018863 on Dec. 10, 2004, now Pat. No. 7,271,943.

(30) Foreign Application Priority Data

Dec. 25, 2003 (JP) ............................ 2003-430425
Nov. 8, 2004 (JP) ............................ 2004-323758

(51) Int. Cl.
*G02B 26/08* (2006.01)
(52) U.S. Cl. ..................................... 359/224
(58) Field of Classification Search ......... 359/223–226, 359/290–292, 871, 872
See application file for complete search history.

(56) References Cited

U.S. PATENT DOCUMENTS

| | | | | |
|---|---|---|---|---|
| 4,317,611 A | 3/1982 | Petersen | ..................... | 350/6.6 |
| 4,859,846 A | 8/1989 | Burrer | ......................... | 250/234 |
| 5,025,346 A | 6/1991 | Tang et al. | ................... | 361/283 |
| 5,543,956 A | 8/1996 | Nakagawa et al. | .......... | 359/225 |
| 6,067,858 A | 5/2000 | Clark et al. | ............... | 73/504.16 |
| 6,201,226 B1 | 3/2001 | Shimada et al. | .......... | 250/201.3 |
| 6,215,114 B1 | 4/2001 | Yagi et al. | .................... | 250/216 |
| 6,333,497 B2 | 12/2001 | Shimada et al. | .......... | 250/201.3 |
| 6,335,522 B1 | 1/2002 | Shimada et al. | .......... | 250/201.3 |
| 6,408,123 B1 | 6/2002 | Kuroda et al. | ............... | 385/130 |
| 6,477,132 B1 | 11/2002 | Azuma et al. | ............... | 369/126 |
| 6,497,141 B1 | 12/2002 | Turner et al. | .................. | 73/105 |
| 6,710,680 B2 | 3/2004 | Niu et al. | ..................... | 333/186 |
| 6,900,925 B2 | 5/2005 | Kato et al. | ................... | 359/298 |
| 7,038,834 B2 | 5/2006 | Kato et al. | ................... | 359/296 |
| 7,085,030 B2 * | 8/2006 | Sakai | ......................... | 359/224 |
| 2005/0128609 A1 | 6/2005 | Shimada et al. | ............. | 359/849 |

FOREIGN PATENT DOCUMENTS

| | | |
|---|---|---|
| JP | 57-8520 | 1/1982 |
| JP | 6-175060 | 6/1994 |

(Continued)

*Primary Examiner*—Euncha P Cherry
(74) *Attorney, Agent, or Firm*—Fitzpatrick, Cella, Harper & Scinto

(57) ABSTRACT

The present invention provides a resonance type micro-oscillating member capable of retraining a fluctuation of angular velocity, and specifically provides a micro-oscillating member, which is a nested micro-oscillating member, wherein there exist a reference oscillation mode which is the characteristic oscillation mode of a reference frequency, and an even numbered oscillation mode which is the characteristic oscillation mode of a frequency being approximate even number times the reference frequency.

11 Claims, 10 Drawing Sheets

FOREIGN PATENT DOCUMENTS

| | | |
|---|---|---|
| JP | 7-27989 | 1/1995 |
| JP | 9-230279 | 5/1997 |
| JP | 9-230276 | 9/1997 |
| JP | 9-230277 | 9/1997 |
| JP | 9-230278 | 9/1997 |
| JP | 2003-279879 | 10/2003 |

* cited by examiner

IN-PHASE FLEXURE MODE

REVERSE-PHASE FLEXURE MODE

MICRO-OSCILLATING MEMBER, LIGHT-DEFLECTOR, AND IMAGE-FORMING APPARATUS

TECHNICAL FIELD

The present invention relates to a micro-oscillating member belonging to the technical filed of a microstructure, and specifically to a micro-oscillating member suitable for a light-deflector, and a light-deflector using the micro-oscillating member. Further, the present invention relates to an image-forming apparatus, such as a scanning type display, a laser beam printer, a digital copying machine, using this light-deflector.

BACKGROUND ART

Heretofore, various light-deflectors in which mirrors are resonance-driven have been proposed. In general, a resonance type light-deflector is characterized in that, comparing to a light scanning optical system using a polygonal rotating mirror such as a polygon mirror, the light-deflector can be made compact to an large extent, and the consumption power thereof can be reduced, and there exists no face tangle in theory, and particularly, a light-deflector comprising Si single-crystal manufactured by a semiconductor process theoretically has no metal fatigue, and is excellent in durability (Japanese Patent Application Laid-Open No. S57-8520).

In the meantime, in the resonance type reflector, there is a problem that, since a scanning angle of the mirror changes in sine-wise in principle, an angular velocity is not constant. To correct this characteristic, several techniques have been proposed.

For example, in Japanese Patent Application Laid-Open Nos. H9-230276, H9-230277, H9-230278, and H9-230279, an arcsin lens is used as an image-forming optical system (image-forming lens), so that a constant velocity scanning is realized on a scanned surface.

Further, in Japanese Patent Application Laid-Open No. 2003-279879, two pieces of deflection reflecting surfaces are driven by sine oscillations of mutually different oscillation cycles, thereby synthesizing sine waves and realizing an approximate constant angular velocity drive within a scanning range.

Further, in U.S. Pat. No. 4,859,846, by using a resonance type reflector having a basic frequency and an oscillation mode of a frequency being three times the basic frequency, an approximate chopping wave drive is realized.

In an electro-photography such as a laser beam printer, a laser light is scanned on a photosensitive body so as to form an image. At that time, the scanning velocity of the laser light is preferably a constant velocity on the photosensitive body. Hence, in a light-scanning means used in the electro-photography, it is general that, after the light-deflector performs the scanning, an optical correction is carried out.

For example, in the light-scanning optical system using the polygonal rotating mirror, in order to convert a light flux reflected and deflected at the constant velocity by the deflection reflecting surface into the constant scanning on the photosensitive body, an image-forming lens called as a fθ lens is used.

Further, in the light-scanning optical system using the light-deflector for performing a sine oscillation, in order to change a light flux in which the angular velocity changes in a sine wise into the constant velocity scanning on the photosensitive body, an image-forming lens called as an arcsin lens is used.

However, the arcsin lens has a problem in that the size of a beam spot of the laser light on the photosensitive body changes at the time of the optical scanning correction. In general, in the image-forming apparatus, there exist allowable upper and lower limits to the size of the beam spot allowable according to a required image quality. Therefore, in the angular velocity of the laser light emitted from the light-deflector, there exists an allowable value in the fluctuation width of the angular velocity. Here, the upper and lower limits of the angular velocity are denoted by $\theta'_{max}$, and $\theta'_{min}$, respectively.

Now, in the light-deflector performing the sine oscillation, a displacement angle θ and the angular velocity θ' can be represented by the following formulas:

$$\theta = \theta_o \sin(\omega t) \quad \text{(Formula 1)}$$

$$\theta' = \theta_o \omega \cos(\omega t) \quad \text{(Formula 2)}$$

provided that $\theta_o$ is the maximum displacement angle, and ω is the number of angular oscillations. At this time, the relations of $$\theta'_{max} = \theta_o \omega \quad \text{(Formula 3)}$$

$$\theta'_{min} = \leq \theta_o \omega \cos(\omega t) \quad \text{(Formula 4)}$$

are established. FIG. 17 explains these states. In FIG. 17, the time range satisfying the above described formulas in the vicinity of t=0 is within a range of:

$$-\cos^{-1}(\theta'_{min}/\theta_o\omega) \leq \omega t \leq -\cos^{-1}(\theta'_{min}/\theta_o\omega) \quad \text{(Formula 5)}$$

and the maximum usable deflection angle $\theta_{eff}$ satisfying this condition and an effective time $t_{eff}$ which is a usable time in one cycle become as follows:

$$\theta_{eff} = \theta_o \sin(\cos^{-1}(\theta'_{min}/\theta'_{omax})) \quad \text{(Formula 6)}$$

$$t_{eff} = 2 \cos^{-1}(\theta'_{min}/\theta'_{max})/\omega \quad \text{(Formula 7)}$$

For example, if θ' is allowable up to ±20% for a reference angular velocity, it becomes $$\theta'_{min}:\theta'_{max} = 0.8:1.2 \quad \text{(Formula 8)}$$

and thereby the maximum usable deflection angle $\theta_{eff}$ and the effective time $t_{eff}$ become as follows:

$$\theta_{eff} = \sin(\cos^{-1}(0.8/1.2)) = 0.7454\theta_o \quad \text{(Formula 9)}$$

$$t_{eff} = 2\cos^{-1}(0.8/1.2)/\omega = 1.6821/\omega \quad \text{(Formula 10)}$$

In this way, there is a problem that the conventional resonance type light defector is unable to fully obtain the maximum usable defection angle $\theta_{eff}$ and the effective time $t_{eff}$ as large values.

Further, there is a problem that, since the resonance type deflector has the same angular velocity in moving back and forth, when making a single side scanning, the time effectively acquired for the scanning becomes short.

Further, there is a problem that, when a plurality of deflectors are used for correcting these problems, the structure becomes complicated.

Further, there is a problem that since the mirror has to maintain a desired flatness even at the time of driving, its rigidity has to be enhanced so as to restrain the deformation of the mirror. In the light-deflector performing the sine oscillation as in the Formula 1, the angular velocity θ'' of the mirror can be given as follows.

$$\theta'' = -\theta_o \omega^2 \sin(\omega t) \quad \text{(Formula 11)}$$

In the above example, the angular acceleration becomes the maximum value at both ends of the scanning, and the maximum value is:

$$\theta''_{max} = \theta_o \omega^2 \sin(\cos^{-1}(0.8/1.2)) = 0.7454 \theta_o \omega^2 \quad \text{(Formula 12)}$$

Further, there is a problem that, when assembling a movable element and a torsion spring, it takes a lot of troubles, and moreover, it is easy to generate an assembly error.

Further, there is a problem that, when trying to make the moment of inertia of the movable element large, it makes a miniaturization difficult. In the resonance type light-deflector having two or more of movable elements, it is most desirable that the moment of inertial of the movable element on which a light-deflecting element is arranged is the smallest. However, when attempting to form movable elements and a torsion springs by working a piece of plate, in order to make the moment of inertial large, a plate having a large area is required. This becomes a barrier for miniaturization. Further, in case the movable elements and the torsion springs are formed by the semiconductor process, a larger size of a foot print large becomes a cause of cost increase.

Further, there is a problem that, when the movable elements are connected in series by the torsion springs, it is easy to generate not only torsion, but also a flexure oscillation mode.

FIG. 18 is a model for explaining a flexure oscillation mode. Movable elements 1601 and 1602 are connected by a torsion spring 1611, and the movable element 1602 and a support portion 1621 are connected by a torsion spring 1612. Such a system generally has two flexure oscillation modes. The oscillation mode form at this time is shown in FIGS. 19A and 19B. FIG. 19A shows an in phase flexure oscillation mode at a lower frequency, and FIG. 19B shows a reverse phase flexure oscillation mode at a higher frequency. It is desirable that these oscillation modes are controlled as much as possible.

DISCLOSURE OF INVENTION

To solve the above-described problems, the micro-oscillating member of the present invention is a micro-oscillating member, comprising: a plurality of movable elements; a plurality of torsion springs arranged on the same axis which connects the plurality of movable elements in series; a support portion for supporting a part of the plurality of torsion springs; driving means for applying a torque to at least one of the movable elements; and driving control means for controlling the driving means, wherein a system comprising the plurality of torsion springs and the plurality of movable elements has a plurality of isolated characteristic oscillation modes, and in the isolated characteristic oscillation modes, there exist a reference oscillation mode which is an characteristic oscillation mode of a reference frequency, and an even numbered oscillation mode which is an characteristic oscillation mode of a frequency being approximate even number times the reference frequency.

Further, in the above-described micro-oscillating member, it is preferable that the plurality of movable elements and the plurality of torsion springs are integrally formed from a piece of plate.

Further, in the above-described micro-oscillating member, it is preferable that the piece of plate is a single-crystalline silicon wafer.

Further, in the above-described micro-oscillating member, it is preferable that, when a flat plane is provided perpendicular to the axis of the torsion springs, the flat plane intersects one of the plurality of torsion springs and at least one of the plurality of movable elements.

Further, in the above-described micro-oscillating member, it is preferable that, when a flat plane is provided perpendicular to the axis of the torsion springs, the flat plane intersects two or more of the plurality of movable elements.

Further, in the above-described micro-oscillating member, it is preferable that the plurality of movable elements are connected to two of the plurality of torsion springs.

Further, the present invention is the micro-oscillating member characterized in that the driving control means controls the driving means so as to simultaneously excite the reference oscillation mode and the even numbered oscillation mode.

Further, in the above-described micro-oscillating member, it is preferable that, at a driving time, an increasing time of a displacement angle of at least one of the plurality of movable elements and a decreasing time of the displacement angle are different.

Further, the light-deflector of the present invention is a light-deflector comprising the above-described micro-oscillating member and a light-deflecting element arranged on the movable-element of the micro-oscillating member.

Further, the image-forming apparatus of the present invention is an image-forming apparatus comprising the above-described light-deflector, a light source, and an image-forming optical system.

BEST MODE FOR CARRYING OUT THE INVENTION

Figure 1A:
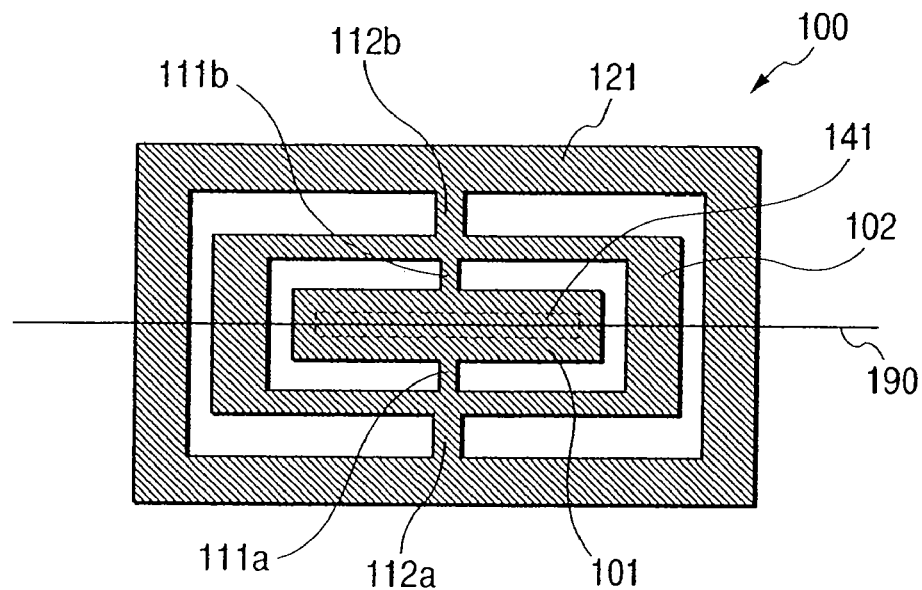
FIGS. 1A and 1B are views explaining a light-deflector of a first embodiment.

By utilizing the present invention, it is possible to restrain the fluctuation of an angular velocity in a resonance type micro-oscillating member. Particularly, a light-deflector of the present invention is suitable for an image-forming apparatus such as a laser beam printer, a digital copying machine.

First, reference numerals in the drawings will be described.

Reference numerals 100 and 200 denote plate members. Reference numerals 101, 102, 201 to 203, 1001 to 1003, 1101, 1102, 1301, 1302, 1401, 1402, 1501, 1502, 1601 and 1602 denote movable elements.

Reference numerals 111a, 111b, 112a, 112b, 211 to 213, 1311, 1312, 1511, 1512, 1011 to 1013, 1111, 1112, 1411, 1412 and 1611 denote torsion springs.

Reference numerals 121 and 221 denote support frames.

Reference numerals 1021, 1121, 1321, 1421, 1521, 1522 and 1621 denote support portions.

Reference numerals 131 denotes a light-reflecting film. Reference numeral 1131 a light-reflecting element. Reference numeral 1141 driving means. Reference numeral 1151 denotes driving control means. Reference numerals 1391, 1392 and 1491 denote planes perpendicular to the axis of the torsion springs. Reference numeral 140 denotes an electromagnetic actuator. Reference numeral 141 denotes a permanent magnet. Reference numeral 142 denotes a coil. Reference numeral 144 denotes a yoke. Reference numeral 143 denotes a core. Reference numeral 150 denotes a controller. Reference numeral 190 denotes a cutting line. Reference numeral 151 denotes a reference clock generator. Reference numeral 152 denotes a frequency divider. Reference numerals 153 and 154 denote counters. Reference numerals 155 and 156 denote sine function units. Reference numeral 157 and 158 denote multipliers. Reference numeral 159 denotes an adder. Reference numeral 160 denotes a DA converter. Reference numeral 161 denotes a power amplifier. Reference numeral 301 denotes a light-deflector of the present invention. Reference numeral 302 denotes a light source. Reference numeral 303 denotes an emission optical system. Reference numeral 304 denotes an image-forming optical system. Reference numeral 305 denotes a photosensitive drum. Reference numeral 311 denotes a laser light. Reference numeral 312 denotes a scanning trajectory. Reference numeral 1201 denotes θ1' of the formula 16. Reference numeral 1202 denotes θ of the formula 2. Reference numeral 1211 denotes θ'$_{max}$. Reference numeral 1212 denotes θ'$_{min}$. Reference numeral 1221 denotes an effective time of the angular velocity θ1'. Reference numeral 1222 denotes an effective time of the sine wave θ'. Reference numeral 1231 denotes θ1 of the formula 15. Reference numeral 1232 denotes θ of the formula 1. Reference numeral 1241 denotes the maximum effective displacement angle of the present invention. Reference numeral 1242 denotes the maximum effective displacement angle of the sine wave. Reference numeral 1251 denotes θ1'' of the formula 15. Reference numeral 1252 denotes θ1'' of the formula 1. Reference numeral 1261 denotes an angular acceleration lowering section.

Figure 7:
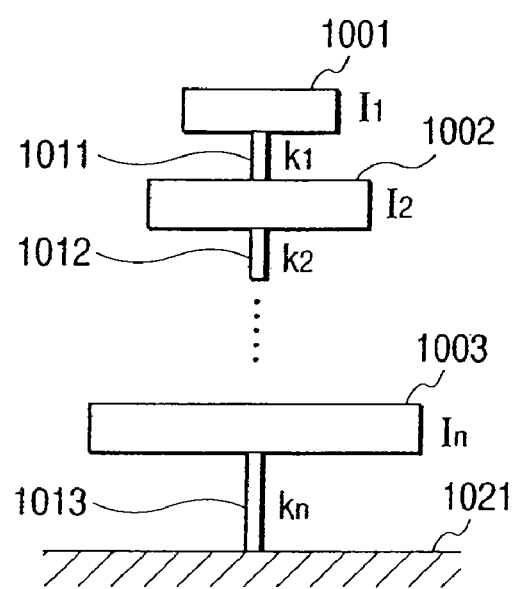
FIG. 7 is a view explaining a principle of a micro-oscillating member of the present invention.

FIG. 7 is a view explaining a principle of the micro-oscillating member of the present invention. In FIG. 7, reference numerals 1001 to 1003 denote n pieces of movable elements, reference numerals 1011 to 1013 denote n pieces of torsion springs and reference numeral 1021 schematically illustrates a support portion. The torsion springs 1011 to 1013 are linearly arranged, and the movable elements 1001 to 1003 are allowed to be capable of oscillating around the torsion axes of the torsion springs 1011 to 1013. The formula of the free oscillation of this system is given below.

$$M\ddot{\theta} + K\theta = 0 \quad \text{(Formula 13)}$$

$$\theta = \begin{pmatrix} \theta_1 \\ \theta_2 \\ \vdots \\ \theta_n \end{pmatrix}, M = \begin{pmatrix} I_1 & & & \\ & I_2 & & \\ & & \ddots & \\ & & & I_n \end{pmatrix},$$

$$K = \begin{pmatrix} k_1 & -k_1 & & & \\ -k_1 & k_1+k_2 & -k_2 & & \\ & & \ddots & & \\ & & & -k_{n-1} & k_{n-1}+k_n \end{pmatrix}$$

In the above formula, $1_k$: the moment of inertia of a movable element, $k_k$: the spring constant of a torsion spring, and $\theta_k$: a torsion angle of the movable element (k=1, 2, ..., n). When the characteristic value of $M^{-1}K$ of this system is taken as $\lambda_k$ (k=1 to n), the number of angular frequency $\omega_k$ of a characteristic mode is given by $$\omega_k = \sqrt{(\lambda_k)} \quad \text{(Formula 14)}$$

The characteristic of the micro-oscillating member of the present invention is that, in these $\omega_k$, there are a reference frequency and a frequency which is approximate even number times the reference frequency. The "approximate even number times" referred herein is desirably included in the numerical value range of approximate 1.98n to 2.02n (n is an arbitrary integer number) times.

Figure 8:
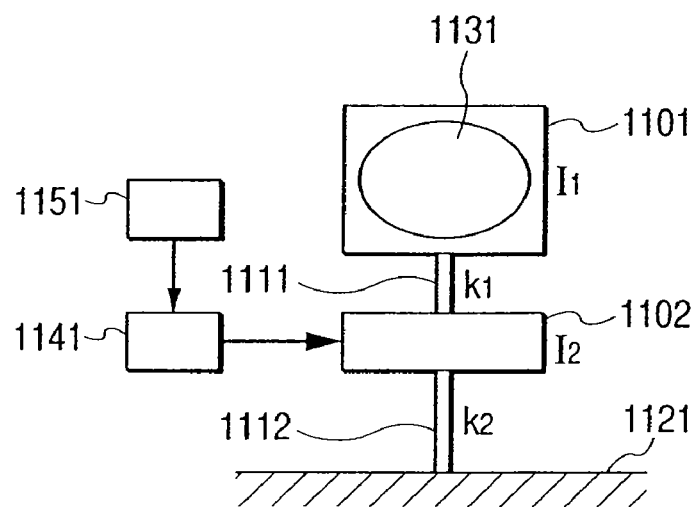
FIG. 8 is a view explaining a principle of the light-deflector of the present invention.

As an example, the resonance type light-deflector in which the number of movable elements is two as shown in FIG. 8 is considered. Reference numerals 1101 and 1102 denote movable elements, reference numerals 1111 and 1112 denote torsion springs, reference numeral 1121 denotes a support portion, reference numeral 1131 denotes a light reflecting element arranged on the movable element 1101, reference numeral 1141 denotes driving means, and reference numeral 1151 denotes driving control means. Here, supposed that $I_1$=1.3951E−11 [kgm$^2$], $I_2$=1.7143E−10 [kgm$^2$], $k_1$=7.91914E−03 [N/m], and $k_2$=3.0123E−02 [N/m]. At this time, since the characteristic value of $M^{-1}K$ become $\lambda_1$=1.5790E08 and $\lambda_2$=6.3166E08, the corresponding number of characteristic frequencies becomes $\omega_1$=2π×2000 [Hz] and $\omega_2$=2π×4000 [Hz]. That is, $\omega_2$=2$\omega_1$. These oscillation modes are hereinafter referred to as "mode 1" and "mode 2", respectively.

Further, in the present invention, the driving control means 1151 controls the driving means 1141 in such a way that the system constituting a plurality of movable elements and torsion springs is oscillated simultaneously by a reference frequency and a frequency which is even number times the reference frequency. At that time, by variously changing the amplitude and the phase of the movable element of the reference frequency and the frequency which is even number times the reference frequency, various driving can be performed.

As one example, the driving control means 1141 controls the driving means 1151 so that the oscillation amplitude of the movable element 1101 in the mode 1 becomes 1.6a, and the oscillation amplitude of the movable element 1101 in the mode 2 becomes 0.4a, thereby making each phase different in 180 degrees. Here, "a" in the following formulas is an arbitrary constant. Since characteristic vectors corresponding to the modes 1 and 2 are $v1=[1, 0.72174]^T$ and $v2=[1, -0.11275]^T$, the oscillation amplitudes $\theta1$ and $\theta2$ of the movable elements 1101 and 1102 can be given as follows.

$$\theta1 = a\{1.6 \sin(\omega_1 t) - 0.4 \sin(2\omega_1 t)\} \quad \text{(Formula 15)}$$

$$\theta2 = a\{1.6(0.72174)\sin(\omega_1 t) - 0.4(-0.11275)\sin(2\omega_1 t)\} \quad \text{(Formula 16)}$$

Since the light-reflecting element 1131 is arranged on the movable element 1101, the movement of the light-reflecting element can be given by $\theta1$. Further, an angular velocity $\theta1'$ and an angular acceleration $\theta1''$ of the movable element 1101 can be represented as follows.

$$\theta1' = a\omega_1\{1.6 \cos(\omega_1 t) - 2 \times 0.4 \cos(2\omega_1 t)\} \quad \text{(Formula 17)}$$

$$\theta1'' = a\omega_1^2\{-1.6 \sin(\omega_1 t) + 4 \times 0.4 \sin(2\omega_1 t)\} \quad \text{(Formula 18)}$$

Figure 9:
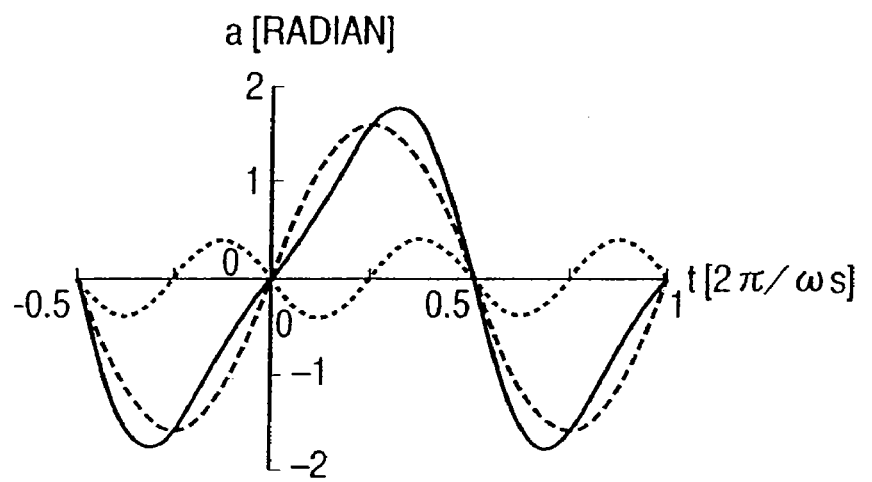
FIG. 9 is a graph explaining a displacement angle of the micro-oscillating member of the present invention.
Figure 10:
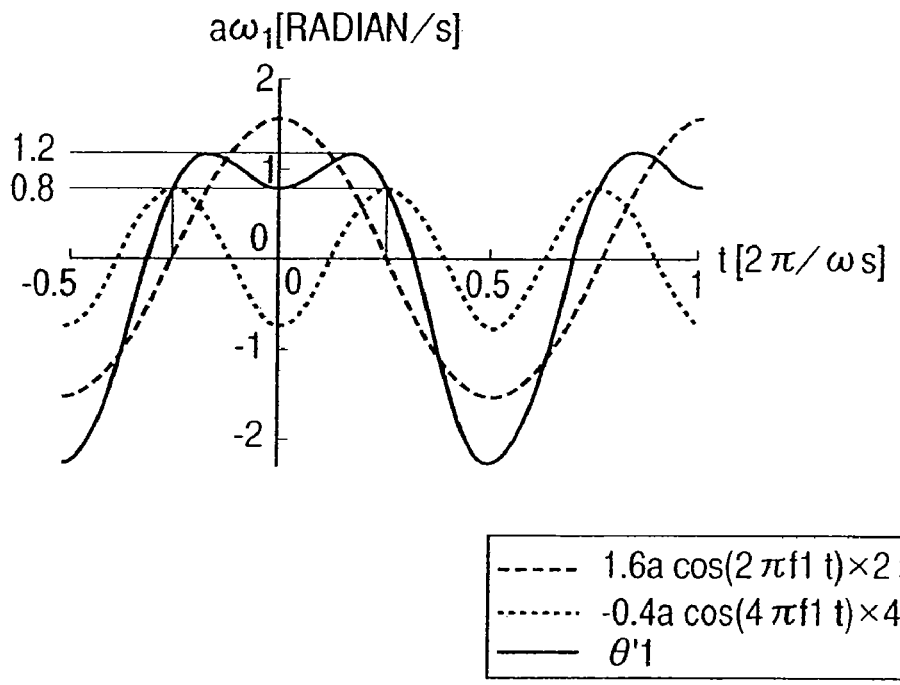
FIG. 10 is a graph explaining an angular velocity of the micro-oscillating member of the present invention.

$\theta1$ and $\theta1'$ are shown in FIGS. 9 and 10, respectively.

Figure 11:
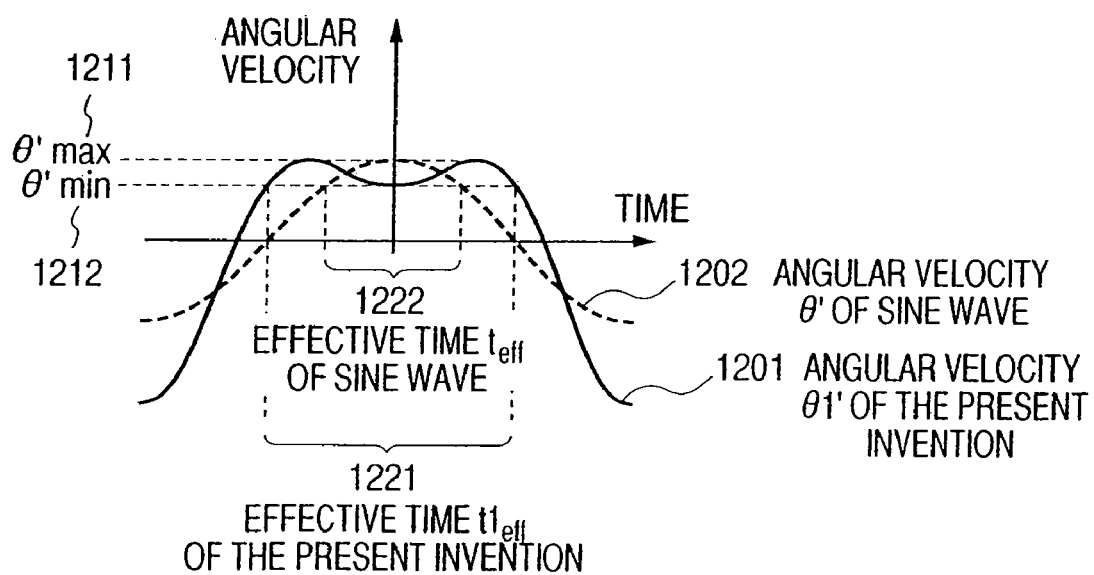
FIG. 11 is a graph comparing an angular velocity of the micro-oscillating member of the present invention to an angular velocity of a sine wave driving.

Next, the effects of the present invention will be described. FIG. 11 is a graph in which $\theta'$ (1202) of the Formula 2 and $\theta1'$ (1201) of the Formula 16 are standardized and plotted in such a way that the maximum values thereof become equal. In this graph, when the time of the angular velocity present in a range between $\theta'_{max}$ (1211) and $\theta'_{min}$ (1212) is taken as an effective time, the effective time of the angular velocity $\theta1'$ (1201) is shown by 1221 in FIG. 11, and the effective time of the sine wave $\theta'$ (1202) is shown by 1222 in FIG. 11. As evident from FIG. 11, the micro-oscillating member of the present invention has a long effective time compared to the sine wave drive. Specifically, since $\theta1'_{max} = 1.2 \times a\omega_1$ and $\theta1'_{min} = 0.8 \times a\omega_1$, from $$\theta1'_{min} = a\omega_1\{1.6 \cos(\omega_1 t) - 2 \times 0.4 \cos(2\omega_1 t)\} \quad \text{(Formula 19)}$$

$$\text{and } 0.8 = 1.6 \cos(\omega_1 t) - 2 \times 0.4 \cos(2\omega_1 t) \quad \text{(Formula 20)},$$

t becomes $t = 0, \pm 1/(2\omega_1/\pi)$. Therefore, the effective time $t1_{eff}$ becomes $$t1_{eff} = \{1/(2\omega_1/\pi) - (-1/(2\omega_1/\pi))\} = \pi/\omega_1 \quad \text{(Formula 21)}.$$

Figure 12:
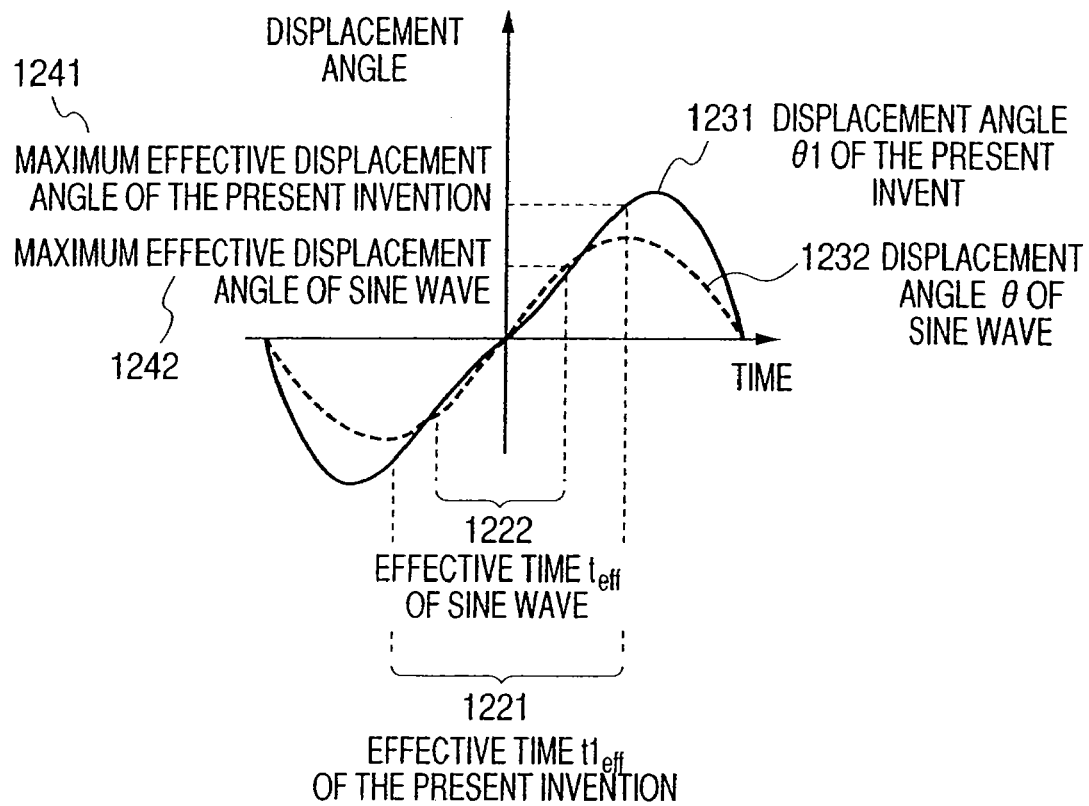
FIG. 12 is a graph comparing a displacement angle of the micro-oscillating member of the present invention to a displacement angle of the sine wave driving.

Further, it is evident from FIG. 12 that the time of increasing the displacement angle $\theta1$ (section in which the graph moves to the right upper side) is longer than the time of decreasing the displacement angle $\theta1$ (section in which the graph moves to the right lower side). That is, by utilizing the present invention, different from the light-deflector of the sieve wave drive, the scanning velocity can be changed in moving back and forth. This is an advantageous characteristic in the image-forming apparatus, which performs an image forming only when light is scanned in one fixed direction.

FIG. 12 is a graph in which $\theta1$ (1231) of Formula 15 and $\theta$ (1232) of Formula 1 are plotted under the same condition as FIG. 11. When the displacement angle having an angular velocity present in the range between $\theta'_{max}$ (1211) and $\theta'_{min}$ (1212) is taken as an effective displacement angle, in this graph, since respective effective times of $\theta1$ (1231) and $\theta$ (1232) are shown by 1211 and 1212 in FIG. 12, the maximum effective displacement angles of present invention and the sine wave become $\theta1_{eff}$ 1241 and $\theta_{eff}$ 1242, respectively. As evident from FIG. 12, $\theta1_{eff}$ 1241 of the present invention is larger than $\theta_{eff}$ 1242. The $\theta1_{eff}$ at this time can be represented as follows.

$$\theta1_{eff} = a\{1.6 \sin(\pi/2) - 0.4 \sin(\pi)\} = 1.6a \quad \text{(Formula 22)}$$

Figure 13:
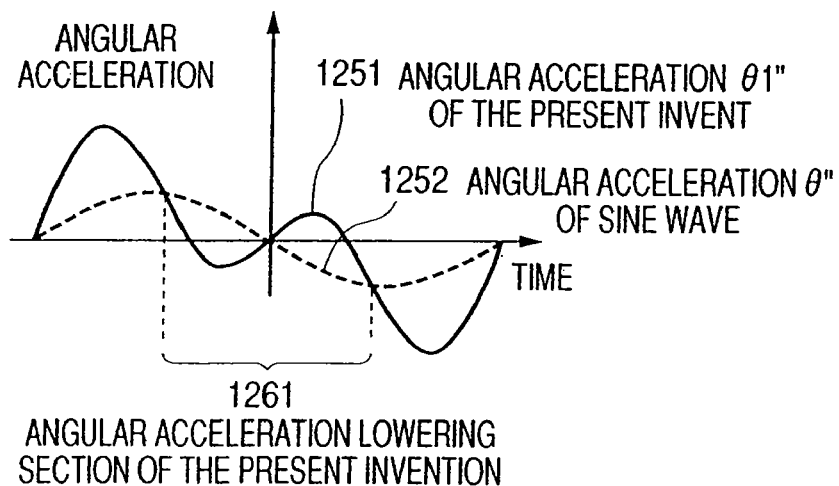
FIG. 13 is a graph comparing an angular acceleration of the micro-oscillating member of the present invention to an angular acceleration of the sine wave driving.

FIG. 13 is a graph in which $\theta1''$ (1251) of Formula 15 and $\theta''$ (1252) of Formula 1 are plotted under the same condition as in FIG. 11. From FIG. 13, it can be read that, in the angular acceleration lowering section 1261, the absolute value of $\theta1''$ (1251) is small compared with $\theta''$ (1252). In case the mirror is used as the light-scanning unit, since its dynamic flexure is proportional to the angular acceleration, according to the present invention, when the same mirror is used, the dynamic flexure becomes smaller. Further, when the same dynamic deflection is allowable, a mirror having a lower rigidity can be used. In general, since a mirror having a low rigidity can be made light in weight, the moment of inertia can be lowered, and the consumption power can be restrained.

Further, in the present invention, the torsion spring and the movable element are integrally formed, so that an assembly labor can be saved and an irregularity of assembly accuracy can be eliminated.

Further, in the present invention, when the torsion spring and the movable element are integrally formed, a silicon wafer is used as a material, so that a Q value which is an index of the acuity of resonance can be enhanced, and the consumption energy can be reduced.

Further, in the present invention, when a flat plane is provided perpendicular to the axis of a torsion springs, movable elements are used so that the flat plane intersects with the plurality of movable elements and torsion springs, whereby a large moment of inertial can be secured within a small area.

Figure 14:
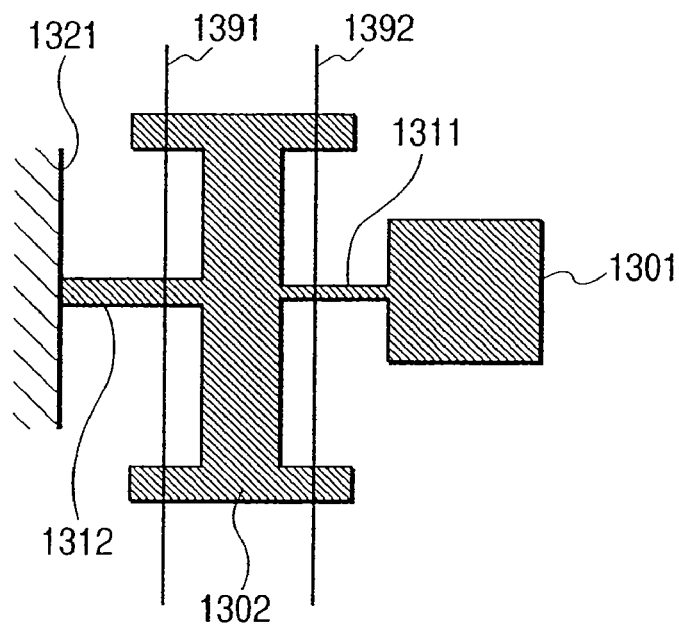
FIG. 14 is a view explaining an effect of the present invention.

In FIG. 14, movable elements 1301 and 1302, and torsion springs 1311 and 1312 are integrally formed from a piece of plate, and the torsion spring 1312 is fixed to a support portion 1321. In this example, a plane 1391 perpendicular to the axis of the torsion springs intersects with the movable elements 1302 and the torsion spring 1312, and moreover, a plane 1392 perpendicular to the axis of the torsion springs intersects with the movable element 1302 and the torsion spring 1311. By using the movable element 1302 in such a shape, an effective moment of inertia can be obtained with a small area.

Figure 15:
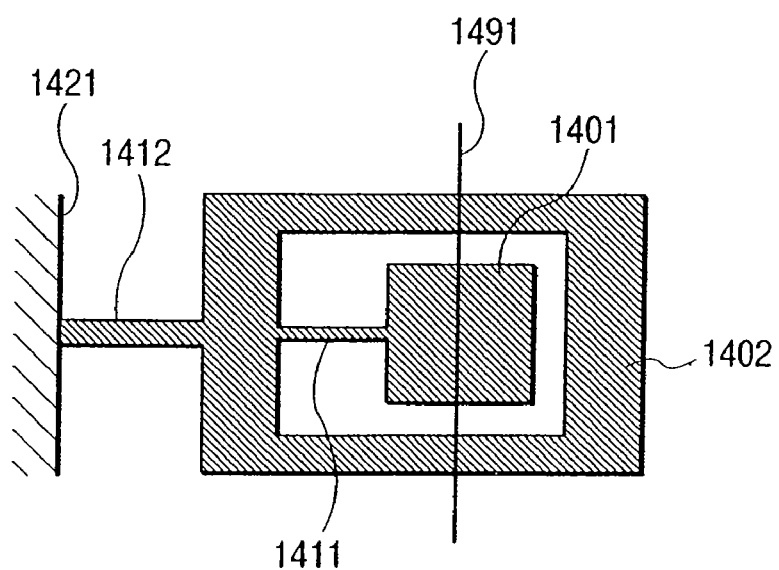
FIG. 15 is a view explaining an effect of the present invention.

In FIG. 15, movable elements 1401 and 1402, and torsion springs 1411 and 1412 are integrally formed from a piece of plate, and the torsion spring 1412 is fixed to a support portion 1421. In this example, a plane 1491 perpendicular to the axis of the torsion springs intersects with the movable elements 1401 and the movable element 1402. By using the movable element 1402 in such a shape, an effective moment of inertia can be obtained with a small area.

Figure 16:
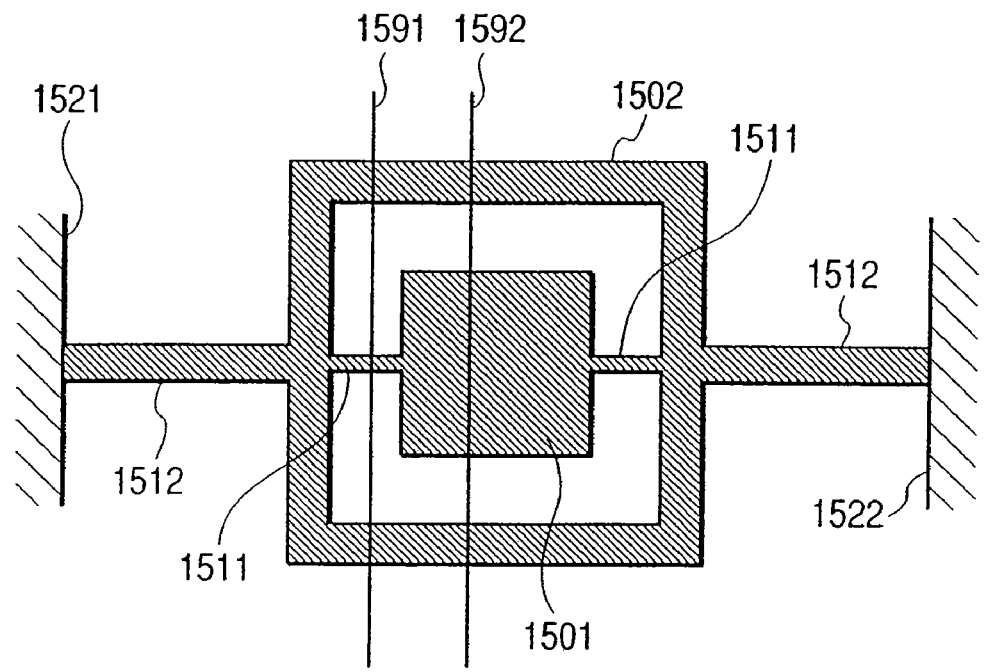
FIG. 16 is a view explaining an effect of the present invention.
Figure 17:
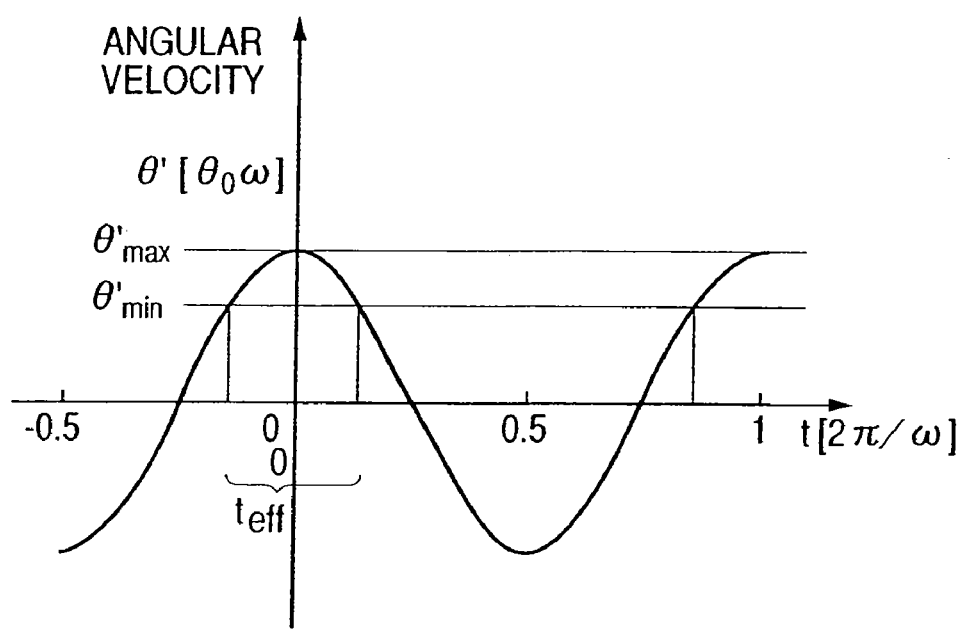
FIG. 17 is a view explaining an effective time of a sine wave driving.
Figure 18:
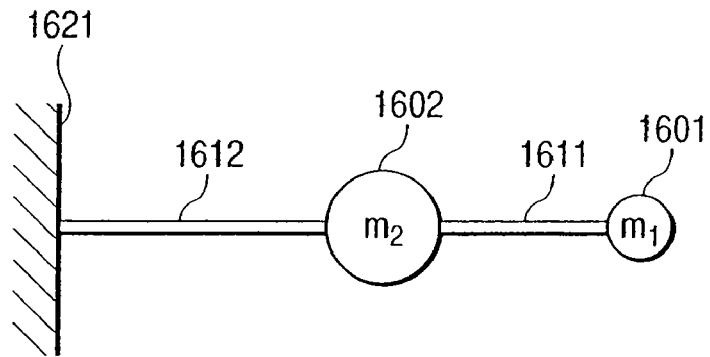
FIG. 18 is a model explaining the flexure oscillation mode of a micro-oscillating member having a plurality of oscillation modes.
Figure 19A:
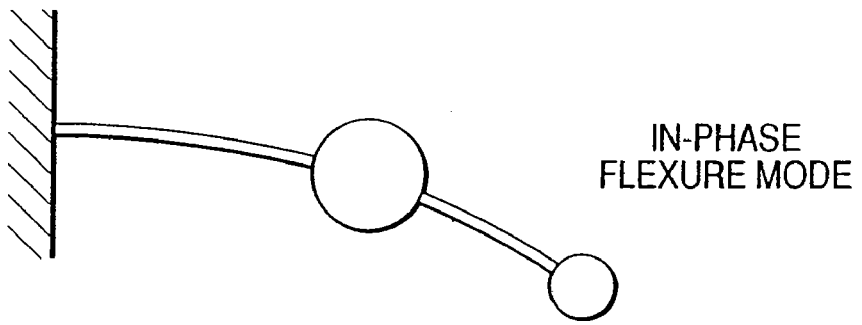
FIGS. 19A and 19B are views explaining the oscillation mode of the flexure oscillation of the micro-oscillating member having a plurality of oscillation modes.
Figure 19B:
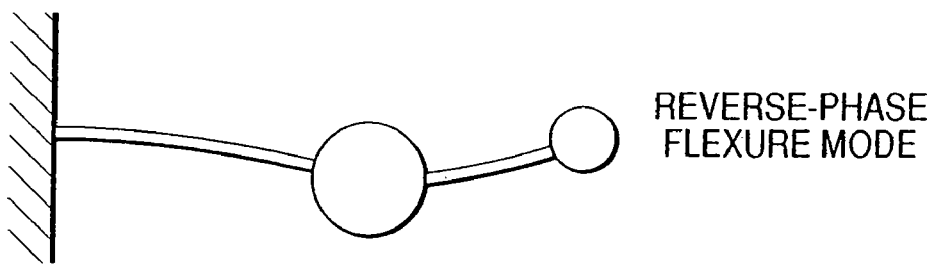

Further, in the present invention, a plurality of movable elements are supported by two pieces of torsion springs, respectively, so that a flexure rigidity is enhanced, and a movement of unnecessary flexure mode can be controlled. In FIG. 16, movable elements 1501 and 1502 and torsion springs 1511 and 1512 are integrally formed from a piece of plate, and the torsion springs 1511 and 1512 are fixed to support portions 1521 and 1522, respectively. As evident from FIG. 16, both of the movable elements 1501 and 1502 are supported respectively by two pieces of torsion springs. By constituting in this way, the movement of the flexure mode can be controlled. Further, a plane 1591 perpendicular to the axis of the torsion springs intersects with the movable element 1502 and the torsion spring 1511, and a plane 1592 perpendicular to the axis of the torsion springs intersects with the movable element 1501 and the movable element 1502. Similarly to FIGS.

14 and 15, even in this shape, there is an effect of obtaining the moment of inertia with a small area.

FIRST EMBODIMENT

Figure 1B:
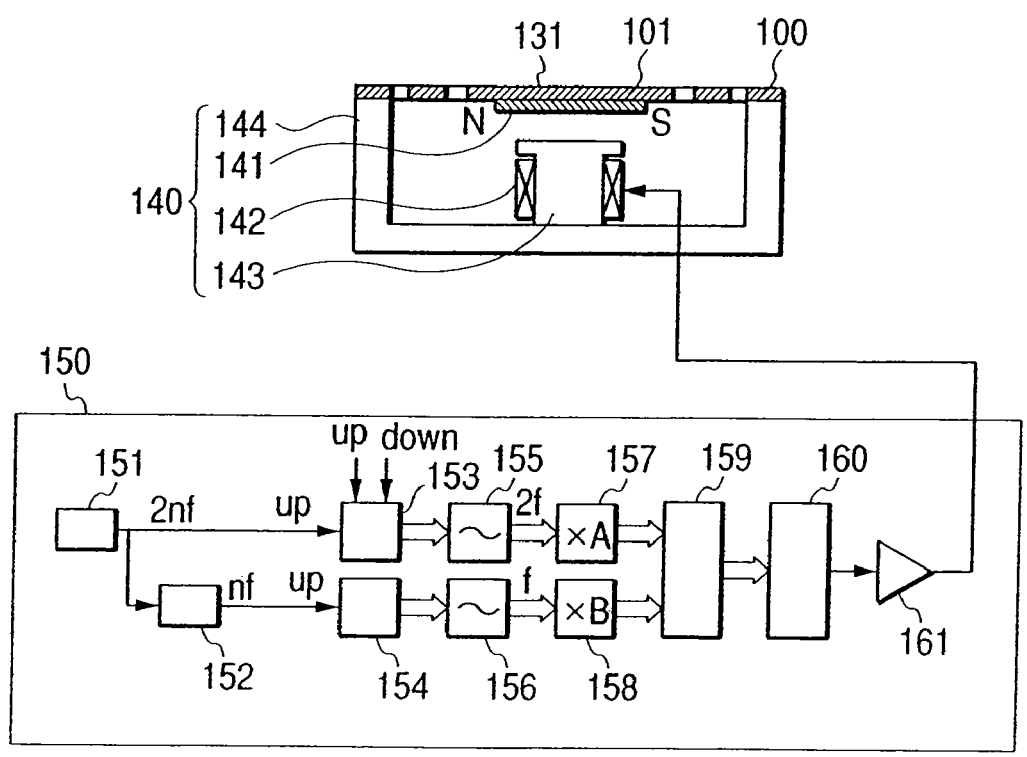

FIGS. 1A and 1B are views for explaining a light-deflector of the present embodiment. The light-deflector of the present embodiment consists of the micro-oscillating member and a light-reflecting film 131 formed on the upper surface of a movable element 101. And the micro-oscillating member consists of a plate member 100, a electromagnetic actuator 140 and a controller 150.

FIG. 1A is a top view of a plate member 100 formed by etching-forming a silicon wafer. A flat movable element 101 is supported up and down in FIG. 1A by two pieces of torsion springs 111*a* and 111*b*. A frame-shaped movable element 102 supports the torsion springs 111*a* and 111*b* in its interior side, and is supported above and below in FIG. 1A by two pieces of torsion springs 112*a* and 112*b*. A frame-shaped support frame 121 supports the torsion springs 112*a* and 112*b* in its interior side. While the movable elements 101 and 102 and the torsion springs 111 and 112 have two oscillation modes, their frequencies are adjusted in such a way as to become approximately double. For example, when the moments of inertia of the movable elements 101 and 102 are taken as I1 and I2, and the spring constants of the torsion springs 111*a* and 111*b* are taken as k1/2, and the spring constants of the torsion springs 112*a* and 112*b* are taken k2/2, and the parameter used in the description of FIG. 8 is used, the number of two characteristic angular frequencies become $\omega_1 = 2\pi \times 2000$ [Hz] and $\omega_2 = 2\pi \times 4000$ [Hz].

FIG. 1B is a schematic illustration for explaining the light-deflector. In FIG. 1B, the plate member 100 illustrates a cross section taken in the cutting line 190 of FIG. 1A. On the upper surface of the movable element 101, there is formed a light-reflecting film 131, and on the lower surface, a permanent magnet 141 is adhered. In FIG. 1B, the plate member 100 is adhered to a yoke 144 made of a material having a high magnetic permeability. In the region of the yoke 144 opposed to the permanent magnet 141, there is arranged a core 143 made of a material having a high magnetic permeability, and a coil 142 is wound around the circumference of the core 143. The permanent magnet 141, the coil 142, the core 143, and the yoke 144 constitute an electromagnetic actuator 140. When the current flows into the coil 142, a torque acts upon the permanent magnet 141, and the movable element 101 is driven.

In a controller 150, a clock signal of the frequency 2nf generated from a reference clock generator 151 is branched into two signals, and the one signal thereof is inputted to a frequency divider 152 and becomes the half frequency nf of the frequency 2nf. These two signals are inputted into increment signals of counters 153 and 154, respectively. The counters 153 and 154 are digital counters, which return to zero when reaching the maximum value n. The outputs of the counters 153 and 154 are inputted to sine function units 155 and 156, respectively. The sine function units 155 and 156 are function units, which, when the input is taken as a X, returns the output of SIN ($2\pi X/n$). The sine function units 155 and 156 generate digital sine signals of frequencies 2f and f, respectively. The sine function units 155 and 156 have gains A and B multiplied by multipliers 157 and 158, respectively, and added together by an adder 159. The output of the adder 159 is converted into an analogue signal by a DA converter 160, and is amplified by a power amplifier 161, and allows to flow a current into the coil 142.

Figure 2:
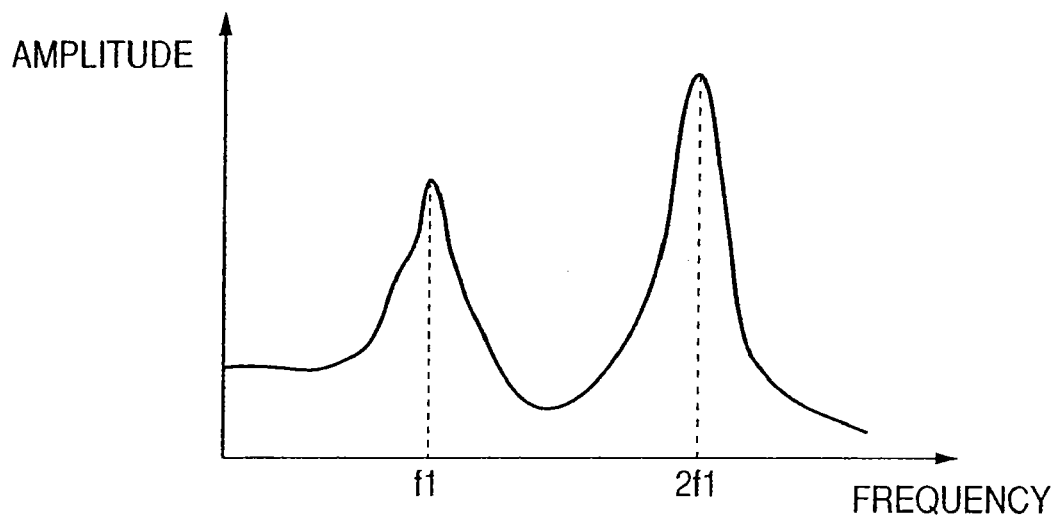
FIG. 2 is a view explaining a resonance characteristic of the light-deflector of the first embodiment.

FIG. 2 is a graph in which the frequency of an alternating current flowing into the coil 142 is plotted in the axis of abscissas and a displacement amplitude of the movable element 101 in the axis of ordinate. In this light-deflector, there exist two characteristic oscillation modes, and moreover, the frequencies thereof are in relation of 1:2. These modes are hereinafter referred to as "mode 1" and "mode 2", respectively. The light-deflector of the present invention is characterized in that these two modes are simultaneously excited.

Next, a method of using the light-deflector of the present embodiment will be described. Displacement measuring means for measuring the displacement of the movable element 101 is prepared to perform an adjustment. First, the generated frequency of the reference clock generator 151 is adjusted, and is matched to a frequency at which the movable element 101 simultaneously resonates in the mode 1 and the mode 2. Next, at such a frequency, the gains of the multipliers 157 and 158 are adjusted so that the amplitudes of the modes 1 and 2 of the movable element 101 become desired values. Increment/decrement of the counter 153 are performed so that the phases of the modes 1 and 2 of the movable element 101 become desired phases. Here, the adjustment of the gains and phases may be performed in reverse order. For example, when a ratio of the amplitude of the mode 1 and the amplitude of the mode 2 is allowed to be 1.6:0.4, and an adjustment is made so that a phase at the scanning center turns in reverse, the movable element 101 is driven in such a way that the displacement angle and the angular velocity are represented as shown in FIG. 13, respectively.

By using the light-deflector of the present invention, the light scanning can be performed with smaller fluctuation of the angular velocity than the conventional resonance type light-deflector.

SECOND EMBODIMENT

Figure 3:
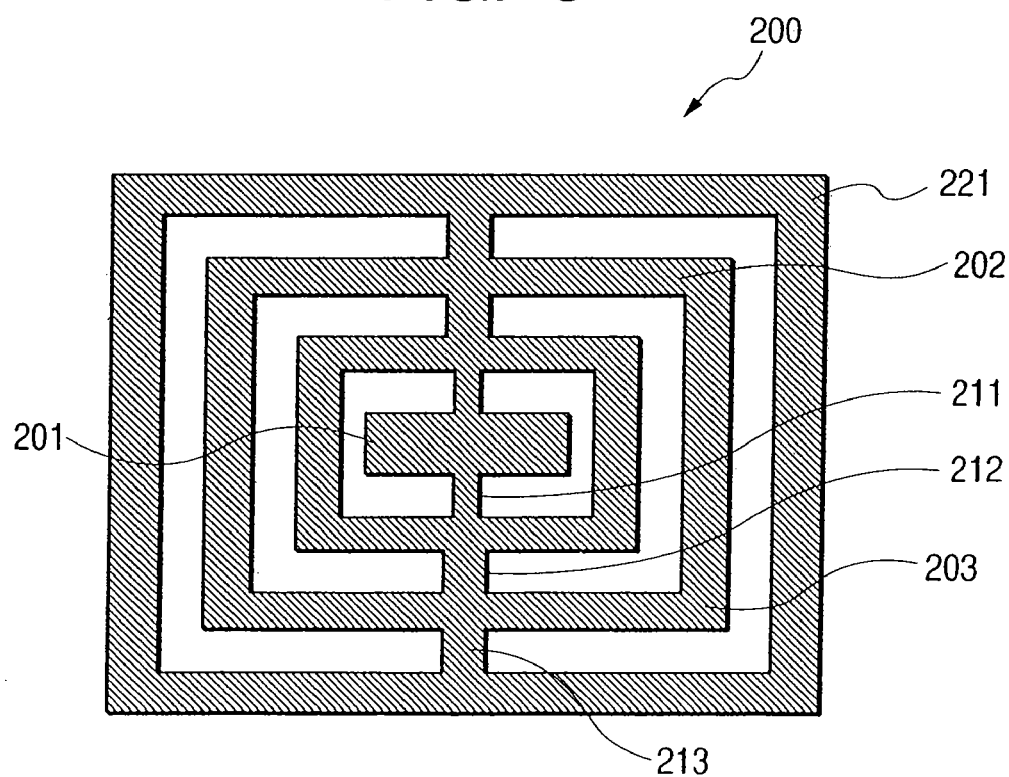
FIG. 3 is a view explaining a plate member used in a light-deflector of a second embodiment.

FIG. 3 is a top view of a plate member 200 formed by etching-working a silicon wafer. Flat movable elements 201 to 203 and torsion springs 211 to 213 are alternately connected in series. The axes of the torsion springs 211 to 213 are linearly arranged, and the other end of the torsion spring 213 is connected to a fixing frame 221. While this system has three oscillation models, the frequencies thereof are adjusted so as to be in relation of approximately 1:2:3. These modes are hereinafter referred to as "model 1", "mode 2" and "mode 3".

As an example, when the moments of inertial of the movable elements 201 to 203 and the torsion spring constants of the torsion springs 211 to 213 are $I_1$, $I_2$, $I_3$, $k_1$, $k_2$, and $k_3$, where $I_1 = 2.0E-11$ [kgm$^2$], $I_2 = 2.0E-10$ [kgm$^2$], $I_3 = 5.0E-10$ [kgm$^2$], $k_1 = 6.17854E-3$ [Nm/rad], $k_2 = 2.03388E-2$ [Nm/rad], and $k_3 = 3.52534E-2$ [Nm/rad], $$M^{-1}K = \begin{pmatrix} 3.08927 \times 10^8 & -3.08927 \times 10^8 & 0 \\ -3.08927 \times 10^7 & 1.32587 \times 10^8 & -1.01694 \times 10^8 \\ 0 & -4.06776 \times 10^7 & 1.11284 \times 10^8 \end{pmatrix}$$

is established, and therefore, it is evident from the Formula 14 that the number of characteristic angular oscillations from the mode 1 to the mode 3 become $2\pi \times 1000$ [rad/s], $2\pi \times 2000$ [rad/s], and $2\pi \times 3000$ [rad/s]. Similarly to the first embodiment, by simultaneously exciting these characteristic oscillation modes, the driving of the combination of these modes 1 to 3 can be performed.

Figure 4:
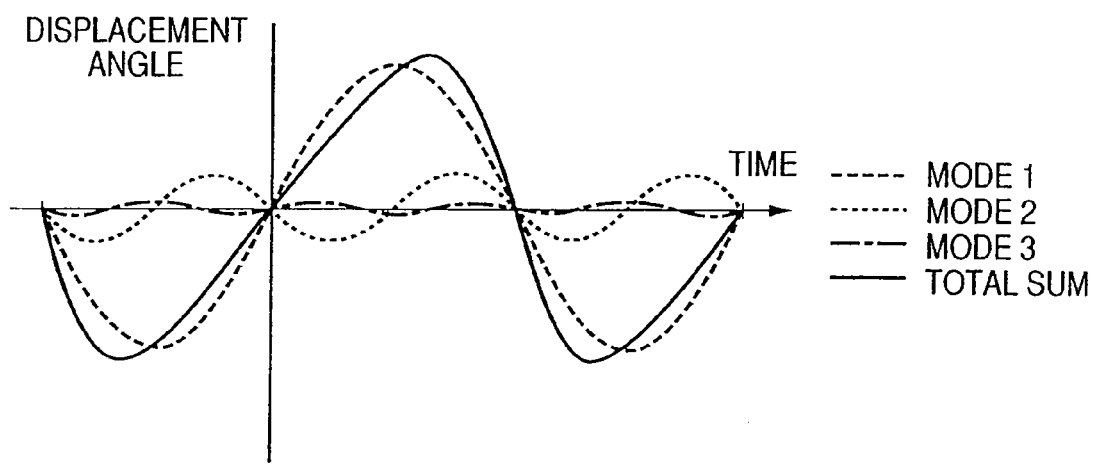
FIG. 4 is a graph explaining a displacement angle of the light-deflector of the second embodiment.
Figure 5:
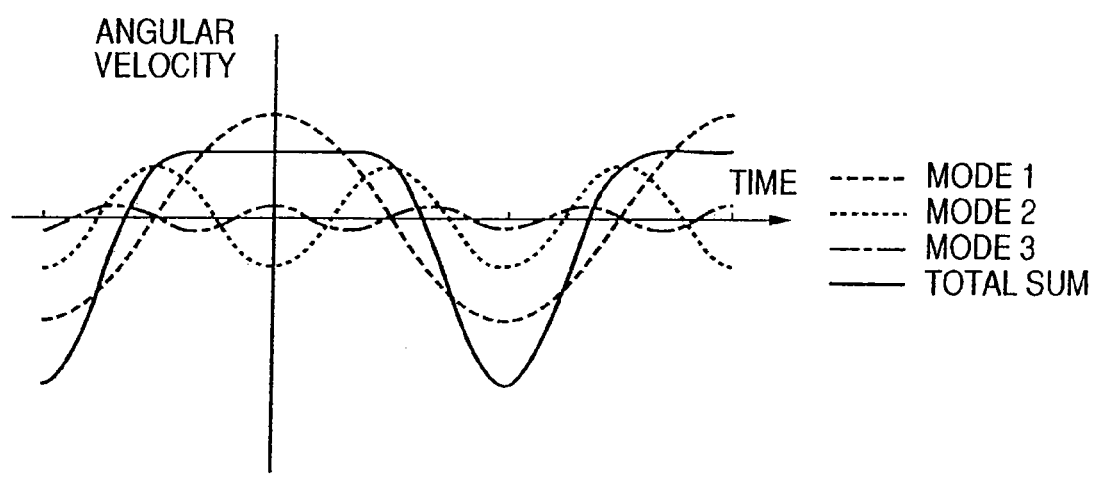
FIG. 5 is a graph explaining an angular velocity of the light-deflector of the second embodiment.

FIGS. 4 and 5 are graphs showing the displacement angle and the angular velocity of the movable element 201 when the amplitude ratio of the movable element 201 in each mode is set to 24:−6:1. The comparison of FIGS. 5 and 10 makes it easy to see a state where a margin of fluctuation of the angular velocity is made small by adding the mode 3.

In this way, by increasing the number of modes, the margin of fluctuation of the angular velocity can be made much smaller.

THIRD EMBODIMENT

Figure 6:
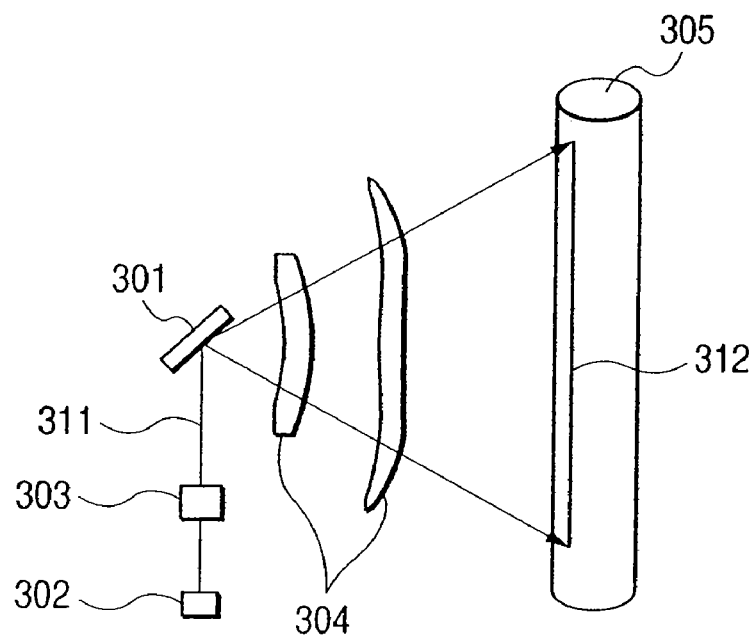
FIG. 6 is a graph explaining an image-forming apparatus of a third embodiment.

FIG. 6 is an example in which the light-deflector of the present invention is applied to the image-forming apparatus such as the laser beam printer. A laser light 311 emitted from a light source 302 is shaped by an emission optical system 303, and is scanned by a light-deflector 301 of the present invention. An image-forming optical system 304 focuses the scanned laser light on a photosensitive drum 305 so as to form a spot. The scanned spot moves along a scanning trajectory 312.

In the image-forming apparatus of the present embodiment, the drawing of an image is performed in the range of an effective time $t1_{\mathit{eff}}$ shown by 1221 in FIG. 12. As evident from FIG. 11, in the light-deflector of the present invention, a scanning angular velocity fluctuates between $\theta'_{min}$ (1212 in FIG. 11) and $\theta'_{max}$ (1211 in FIG. 11) during the scanning.

When an ordinary fθ lens is used for the image-forming optical system 304, the scanning velocity on the photosensitive drum 305 fluctuates. By controlling a modulation clock of laser beams so as to negate the fluctuation of this scanning velocity, a correct image can be formed on the photosensitive drum.

Alternately, it is also possible to allow the focusing optical system 304 to have the characteristic of negating the fluctuation of the scanning velocity. In this case, since the diameter of the spot fluctuates, the scanning method of the light-deflector 301 may be decided so that the margin of fluctuation of this diameter does not exceed a tolerance.

This application claims priority from Japanese Patent Application Nos. 2003-430425 filed Dec. 25, 2003 and 2004-323758 filed Nov. 8, 2004, which are hereby incorporated by reference herein.

The invention claimed is:

1. An oscillating apparatus, comprising:
   a movable system comprising a plurality of movable elements and a plurality of torsion springs, the movable system having a plurality of isolated characteristic oscillation modes;
   a support portion for supporting the movable system;
   a driver for oscillating the movable system; and
   a driving controller for controlling the driver,
   wherein the driving controller controls the driver such that the movable system simultaneously oscillates in at least a first characteristic oscillation mode of a reference frequency and a second characteristic oscillation mode of a frequency being approximately an even number times the reference frequency.

2. The oscillating apparatus according to claim 1, wherein the frequency of the second characteristic oscillation mode is 1.98 times or more to 2.02 times or less of the reference frequency.

3. The oscillating apparatus according to claim 1,
   wherein the plurality of movable elements comprise a first movable element and a second movable element and the plurality of torsion springs comprise a first torsion spring and a second torsion spring, and
   wherein the first torsion spring connects the first movable element to the support portion and the second torsion spring connects the second movable element to the first movable element.

4. The oscillating apparatus according to claim 1,
   wherein the plurality of movable elements comprise a first movable element and a second movable element, and the plurality of torsion springs comprise a pair of first torsion springs and a pair of second torsion springs, and
   wherein the pair of first torsion springs connects the first movable element to the support portion and the pair of second torsion springs connects the second movable element to the first movable element.

5. The oscillating apparatus according to claim 1, wherein the plurality of movable elements and the plurality of torsion springs are integrally formed from one piece of plate.

6. The oscillating apparatus according to claim 1, wherein, at a driving time of the movable system, an increasing time of a displacement angle of at least one of the plurality of movable elements is different from a decreasing time of the displacement angle.

7. The oscillating apparatus according to claim 3, wherein the movable system further comprises a third movable element, and a third torsion spring which connects the third movable element to the second movable element.

8. A light-deflector comprising:
   a oscillating apparatus according to claim 1; and
   a light-reflecting portion provided on at least one of the movable elements.

9. An image-forming apparatus comprising:
   a light source for emitting a laser light;
   a light-deflector according to claim 8; and
   an image-forming optical system for forming an image on a photosensitive member using the laser light deflected by the light-deflector.

10. An oscillating member, comprising:
    a movable system comprising a plurality of movable elements and a plurality of torsion springs, the movable system having a plurality of isolated characteristic oscillation modes; and
    a support portion for supporting the movable system,
    wherein the movable system has at least a first characteristic oscillation mode of a reference frequency and a second characteristic oscillation mode of a frequency being approximately an even number times the reference frequency.

11. The oscillating member according to claim 10, wherein the frequency of the second characteristic oscillation mode is 1.98 times or more to 2.02 times or less of the reference frequency.

* * * * *